(12) United States Patent
Thorgeirsson

(10) Patent No.: US 6,677,966 B2
(45) Date of Patent: Jan. 13, 2004

(54) METHOD OF OPERATING AN APPLIANCE USING A USER INTERFACE HAVING A STATE DIAGRAM REPRESENTING OPERATIVE STATES OF THE APPLIANCE

(75) Inventor: Gudmund Orn Thorgeirsson, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 394 days.

(21) Appl. No.: 09/747,104

(22) Filed: Dec. 21, 2000

(65) Prior Publication Data
US 2001/0013906 A1 Aug. 16, 2001

(30) Foreign Application Priority Data
Dec. 24, 1999 (EP) .............................. 99204532

(51) Int. Cl.[7] .................... H04N 5/50; H04N 5/445
(52) U.S. Cl. .............. 345/810; 345/835; 348/569; 348/563; 725/37
(58) Field of Search ................. 348/563, 569, 348/564, 725, 734, 706; 725/37, 38, 80; 386/1, 43, 86; 345/689, 810, 835, 836, 866, 156, 157, 169, 160; H04N 5/50, 5/44, 5/445

(56) References Cited

U.S. PATENT DOCUMENTS

| 5,416,535 A | | 5/1995 | Sato et al. ................... 348/706 |
| 5,554,980 A | | 9/1996 | Hashimoto et al. ..... 340/825.72 |
| 5,589,893 A | | 12/1996 | Gaughan et al. ............. 348/734 |
| 5,648,791 A | | 7/1997 | Date et al. ..................... 345/89 |
| 5,648,824 A | | 7/1997 | Dunn et al. .................. 348/734 |
| 5,949,407 A | | 9/1999 | Sato ........................... 345/169 |
| 6,104,334 A | * | 8/2000 | Allport ....................... 348/734 |
| 6,137,539 A | * | 10/2000 | Lownes et al. ............. 348/569 |

FOREIGN PATENT DOCUMENTS

| EP | 0390041 A2 | 10/1990 | ............. H04B/1/20 |
| JP | 62021379 | 1/1987 | .......... H04N/5/445 |

* cited by examiner

Primary Examiner—Sherrie Hsia
(74) Attorney, Agent, or Firm—Gregory L. Thorne

(57) ABSTRACT

A method of operating an appliance and an appliance using a display of a state diagram on a display screen. The state diagram shows state symbols representing operative states of the appliance. A state cursor is provided, which indicates a position relative to the state diagram, which state cursor can be relocated in response to user supplied cursor control commands. The appliance can be operated by navigating the state cursor to a state symbol representing a desired state of the appliance, which causes the appliance to adopt the desired state in response to the navigation.

22 Claims, 3 Drawing Sheets

METHOD OF OPERATING AN APPLIANCE USING A USER INTERFACE HAVING A STATE DIAGRAM REPRESENTING OPERATIVE STATES OF THE APPLIANCE

FIELD OF THE INVENTION

The invention relates to a method of operating an appliance. The invention further relates to an appliance capable of performing the above method.

BACKGROUND OF THE INVENTION

The steady increase in complexity of modern home electronic appliances confronts users of such an appliance with the problem of learning its functions, and in which circumstances these functions can be invoked. Traditionally, electronic appliances are controlled by buttons on the appliance itself or on a remote control of the appliance. As the number of functions grows, the number of buttons tends to increase as well, which severely reduces the usability of the appliance. Often, multiple functions are operated by means of a single button, thus requiring, for example, the user to press the button multiple times, account for a time out, or press a 'shift' button simultaneously. As a consequence, a button has a different effect in different situations, or has only effect in one situation while being ineffective in another situation. This is confusing to the user, especially when he is not yet familiar with the appliance.

Graphical user interfaces for controlling appliances can remedy these problems to a certain extent but cause new problems, such as complicated menu systems or an abundance of graphical information. Graphical user interfaces may be designed to show only a limited number of options at a time, to facilitate the operation of the appliance. For example, U.S. Pat. No. 5,648,824 discloses a television receiver capable of displaying a graphical representation of a multi-direction actuation pad of the remote control. Labels representative of functions of the appliance are located near or within the graphical representation, so as to indicate that said functions can be activated by pressing the corresponding part of the actuation pad on the remote control. A problem of such an approach is that the user has only a very limited view on the appliance's functionality.

OBJECT AND SUMMARY OF THE INVENTION

It is an object of the invention to provide an improved method and appliance of the type defined in the opening paragraph, having an easy user interface for controlling the appliance. To that end, a method according to the invention is provided, comprising a step of displaying a state diagram on a display screen, the state diagram comprising state symbols representing operative states of the appliance, a step of displaying a state cursor indicating a position relative to the state diagram, a step of user operably moving, in response to at least one user supplied command indicating a motion direction, the state cursor to a state symbol representing a desired state of the appliance, and a step of bringing the appliance into the desired state in response to said movement. In this way it is achieved that the user is enabled to control the appliance by simply moving the state cursor to a state symbol which represents a desired state of the application. It is further achieved that the user has a comprehensible overview of the appliance's functions. A state is regarded as a user discernable mode of the appliance, for example dedicated to a specific function. In a video recorder (VCR) one may discern a play state, a pause state, a record state etc. In a TV one may discern a TV mode, a VCR mode, a teletext mode, etc. A state symbol may be a simple shape, e.g. a rectangle, bearing a text label indicating the represented state, or a graphical icon representative of said state. A state symbol may also comprise only a text label. The state cursor may, for example, be a pointer or involve emphasizing the state symbol where the state cursor is located, e.g. by means of a differently colored edge, highlighting the entire state symbol, or an additional marker within or near the state symbol. Moving the state cursor to a new state symbol causes the appliance to adopt the state represented by the new state symbol. The user directs the state cursor through the state diagram by issuing commands representing a motion direction, for example, the four directions up, down, left and right. Moving the state cursor may be accomplished by any suitable means, such as arrow buttons on a remote control, a tracker ball, computer mouse, etc.

An embodiment of the method according to the invention is characterized by the method further comprising a step of displaying transition indications for indicating permissible transitions between said operative states, the movement of the state cursor being restricted to proceed in accordance with said permissible transitions. In this way it is achieved that the user cannot erroneously move the state cursor to a state to which there is no permissible transition, thus avoiding unnecessary error messages from the appliance, or avoiding that the appliance does not respond at all. It is further achieved that the user has a comprehensible overview of which functions can be invoked in different situations A permissible transition between states may, for example, be indicated by means of a line or arrow pointing from one state symbol to another state symbol, thus indicating the direction of the permissible transition. Alternatively, a permissible transition may be indicated by state symbols having a common edge or partially overlapping each other. In response to a user command corresponding to a non-permissible direction, the state cursor remains at its current location or moves to a default location or a location which is determined by guessing the user's intention.

An embodiment of the method according to the invention is characterized by the method further comprising a step of displaying a neutral state symbol not representing an operative state of the appliance, a movement of the state cursor to said neutral state symbol having a neutral effect on the operation of the appliance. Such a neutral state symbol can be applied if movement of the state cursor should not cause a state change of the controlled appliance. For example, if the appliance is capable of performing various functions simultaneously, a neutral state symbol can be used to relocate the state cursor while activating or deactivating such functions.

An embodiment of the method according to the invention is characterized by the method further comprising a step of moving the state cursor relative to a state symbol without affecting the current state of the appliance, so as to select a respective state transition related to said state symbol. This embodiment is advantageous if the number of permissible state transitions is higher than the number of moving direction which can be controlled, or if the layout allows multiple transitions in the same direction. For example, if multiple arrows representing state transitions leave a state symbol in an upward direction, the user may select a starting point of the desired transition by, for example, moving left or right, before actually performing the transition. This selection does not affect the state of the appliance, which is visualized by the current state indicator remaining at the same state symbol.

An embodiment of the method according to the invention is characterized by the method further comprising a step of displaying at least one current state indicator marking a respective state symbol as representing a current state of the appliance. It is thus achieved that the current state of the controlled appliance is communicated to the user in a comprehensible way. If multiple functions of the appliance can be performed simultaneously and independently, e.g. playing and recording in a hard-disk based video recorder, multiple current state indicators may be displayed, indicating the state of said functions. The current state indicator marking a state symbol as representing a current state of the appliance may, for example, involve a differently colored edge, highlighting the entire state symbol, or an additional marker within or near the state symbol.

An embodiment of the method according to the invention is characterized by the method further comprising a step of expanding a state symbol, in response to a movement of the state cursor to said state symbol, to display further state symbols representing subordinate states of a state represented by said state symbol. The operation of many appliances can be defined by a hierarchy of states, where a state may have subordinate states which are only relevant within the context of said state. For example, in a consumer audio/video system, a number of states are discernable at a top level including, for example, a TV mode, a VCR mode, a teletext mode etc. Within a VCR mode, subordinate states are discernable, such as a stop state, a play state, a pause state etc. A state symbol representing such a state having subordinate states may comprise nested state symbols representing the subordinate states. Preferably, a state symbol is expanded in response to a movement of the state cursor to the state symbol. Consequently, as soon as a state becomes the current state, its subordinate states of the appliance become visible in the state diagram and the user is enabled to activate any of these subordinate states. Alternatively, the expansion may be performed in response to an explicit user command, for example, by means of a dedicated button on the remote control.

An embodiment of the method according to the invention is characterized by the method further comprising a step of collapsing said state symbol to hide said further state symbols in response to a movement of the state cursor away from said state symbol. Hence, when a state ceases to be the current state, its related state symbol ceases to show symbols representing subordinate states. Alternatively, the collapse may be performed by an explicit user command.

The invention is particularly suitable for consumer electronic appliance, since it provides an easy to learn and consistent user interface, and thereby provides the user with a comprehensible overview of the appliance's functionality.

BRIEF DESCRIPTION OF THE DRAWINGS

These and other aspects of the invention are apparent from and will be elucidated, by way of a non-limitative example, with reference to the embodiment(s) described hereinafter. In the drawings.

DESCRIPTION OF EMBODIMENTS

Figure 1:
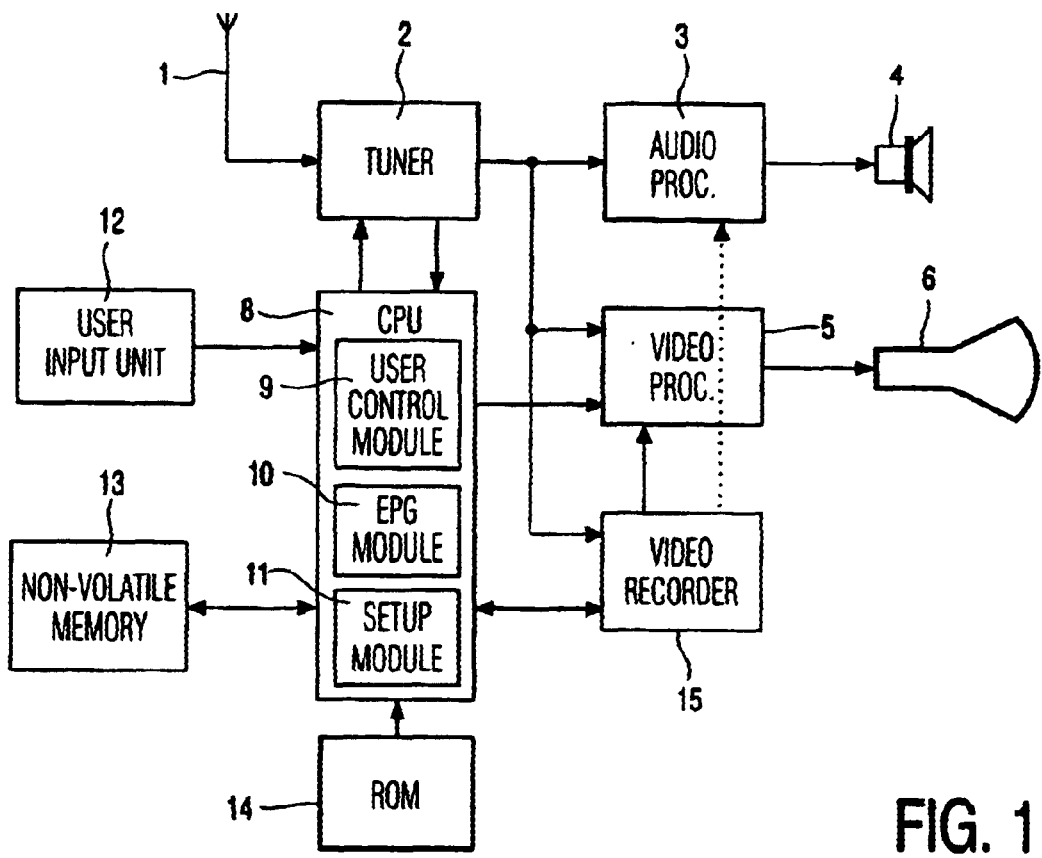
FIG. 1 shows a diagram of a TV-VCR combination as an embodiment of the appliance according to the invention.

FIG. 1 shows a diagram of a TV-VCR combination as an embodiment of the appliance according to the invention. TV signals are received from the ether by an antenna 1 or, alternatively, from a cable network. One of the TV signals is selected by a tuner 2 and is decoded and split into an audio signal, a video signal and a data signal. The audio signal is further processed by an audio processor 3 and a loudspeaker 4. The video signal is further processed by a video processor 5 and presented on a screen 6. The data signal is transmitted to a central processing unit (hereinafter "CPU") 8, which comprises one or more microprocessors capable of executing program instructions stored in a read-only memory (hereinafter "ROM") 14. These program instructions comprise parts of software modules including, a user control module 9, an EPG module 10 and a setup module 11. Data processed by said software modules, e.g. EPG data and user profile information, may be stored in a non-volatile memory 13. The CPU 8 is capable of controlling functions of the TV-VCR and transmitting data to the video processor 5 to be presented on the screen 6. A user input unit 12 receives user commands, e.g. through a remote control, and transmits them to the user control module 9 in order to be processed. For example, when the user enters a channel number the CPU 8 controls the tuner 2 to select the corresponding channel, and sends data to the video processor 5 to present feedback on the screen 6, causing e.g. the preset number, the channel name and the program category to be displayed for a few seconds. In addition to pressing dedicated buttons for controlling functions of the TV-VCR combi, the user may control the appliance by means of a state diagram interface. For this purpose, the user control module 9 is capable of displaying a state diagram of the appliance on the whole or on a part of the display screen 6, and provides interaction means to enable the user to control the TV-VCR by means of the state diagram. This will be explained in more detail hereinafter.

The data signal is decoded from the TV signal by means of, for example, a teletext decoder (not shown), and includes, inter alia, EPG data which provide an overview of programs scheduled for the near future. The EPG data may comprise for each program attributes such as a title, the start time and duration, the channel number, and category information. In response to a predetermined user command, the EPG module 10 is invoked to present a program schedule on the screen 6. A video recorder 15 is capable of recording video and audio signals from the tuner 2 and playing back such signals and transmitting them to the audio processor 3 and the video processor 5, respectively. The video recorder 15 receives control commands from the CPU 8 in response to user commands entered by means of the user input unit 12.

Figure 2:
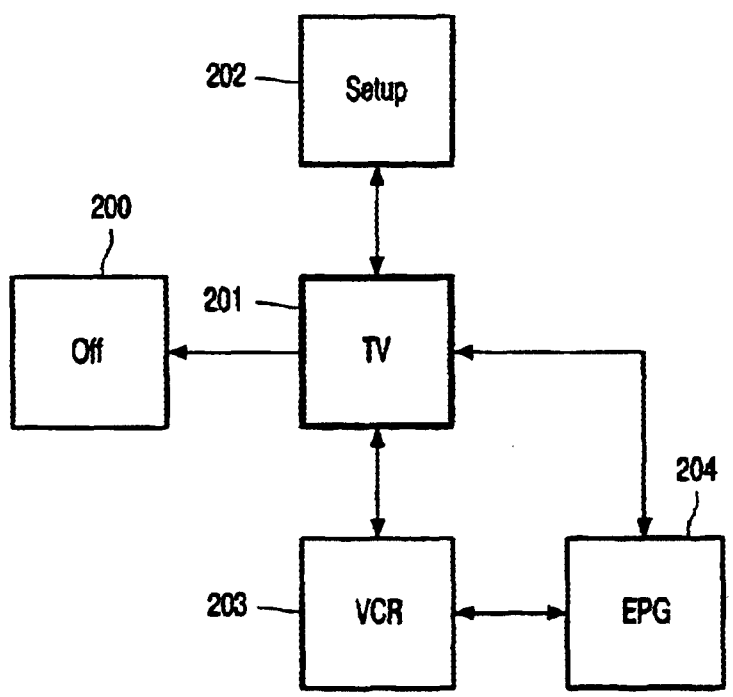
FIG. 2 shows an example of a screen representation of a state diagram for controlling the appliance according to the invention.

FIG. 2 shows an example of a screen representation of a state diagram for controlling the application according to the invention. The state diagram may be displayed permanently on a part of the screen or be activated by a dedicated button on the remote control. It may be semi-transparent so as not to disturb information it is overlapping. When activated explicitly, it may cover the whole screen, and disappear again in response to activation of a desired function. Upon switching on the TV-VCR, it adopts a default TV state 201. From this state, all other user discernable states can be invoked, as is indicated by arrows. This is achieved by operating cursor control keys on the remote control. Alternatively, any other commonly applied means for cursor control may be used. If the user presses the 'up' button in the TV state 201, the appliance enters a setup state 202 for establishing initial settings, such as user preferences, channel map etc. The setup state 202 can only be reached from the TV state 201, as is indicated by the single arrow pointing to the setup state 202. The setup state 202 can also be left via the TV state 201 only, as is indicated by the single arrow leaving the setup state 202.

If, in the TV state 201, the 'down' button is pressed, a VCR state 203 is adopted, and the TV state 201 can be returned to by pressing the 'up' button in the VCR state 203. Similarly, an EPG state 204 is reached by pressing the 'right' button in the TV state 201 or the VCR state 203, respectively. It is possible to return from the EPG state 204 to the TV state 201 by pressing the 'up' button and to the VCR state 203 by pressing the 'left' button. An off state 200 can be adopted only from the TV state 201 by pressing the 'left' button. A state cursor is indicated by a relative thick edge of one the state symbols, as illustrated in FIG. 2 for the TV state 201. In the present embodiment the state cursor further serves to indicate the present state of the appliance. In a more complex embodiment the state cursor and the current state indicator are not necessarily the same, as will be described hereinafter.

Upon entering a state, the related state symbol expands, to show the state's subordinates states, if applicable. For example, the VCR state 203 may expand to show subordinate states such as a play state, a pause state, etc. An example will be described hereinafter with reference to FIG. 3. The subordinate state diagram may replace the original state diagram or be embedded in the original state diagram, e.g. in a nested manner, any state symbols which are not relevant for the subordinate state diagram: being shrunk or faded.

Figure 3:
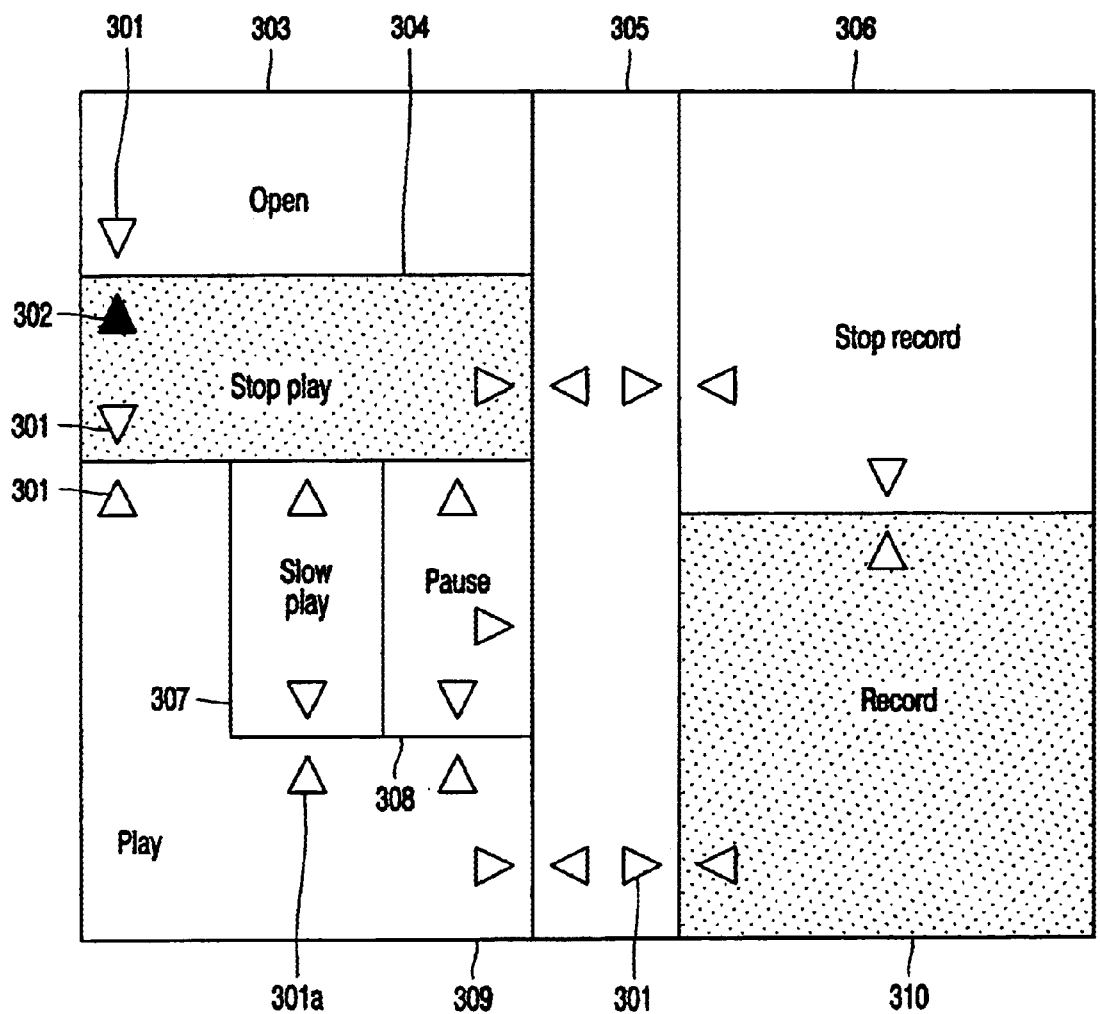
FIG. 3 shows an example of a screen representation of a state diagram for controlling a video disk recorder.

FIG. 3 shows an example of a screen representation of a state diagram for controlling a video disk recorder, which may be a part of the TV-VCR combi of the above embodiment. It comprises a plurality of transition symbols 301, and state symbols representing an open tray state 303, a stop play state 304, a neutral state 305, a stop record state 306, a slow play state 307, a pause state 308, a play state 309 and a record state 310. The transition symbols 301 indicate permissible transitions between states of the appliance. For example, there is no permissible transition between the slow play state 307 and the pause state 308. There is neither a permissible transition between, for example, the slow play state 307 and the open tray state 303. The recorder is capable of simultaneously and independently recording and playing back video and/or audio signals. This is indicated by two current state indicators and involves the highlighting of the state symbols representing the stop play state 304 and the record state 309. A state cursor 302 is provided which coincides with one of the transition symbols 301. The state cursor 302 can be relocated by means of cursor control means, and is bound by the positions of the transition symbols 301. Relocation to a new state symbol causes the appliance to change state, unless the new state symbol is the neutral state 305. Most state symbols comprise multiple transition symbols 301. Relocating the state cursor 302 from one transition symbol to another within the same state symbol has no effect on the state of the appliance, but merely selects one of the permissible transitions having the current state symbol as a starting point, without actually performing the transition. The transition is actually performed by leaving the current state symbol in the direction indicated by the current transition. For example, in the stop play state 304 of FIG. 3, pressing 'up' sets the tray open state 303, causing the disk tray to open. As another example, pressing 'down' twice in the stop play state 304 sets the play state 309, and subsequently pressing 'down' and 'up' causes a transition, via the transition symbol 301a, from the play state 309 to the slow play state 307. A transition from the play state 309 to the neutral state 305 leaves the recording in a playing state, enabling the user to independently control the recording function of the recorder. Similarly, a transition from the record state 310 to the neutral state 305 maintains the recording state, enabling the user to independently control the playback functions on the left side of the state diagram. If a permissible transition has no permissible counter-transition, the state cursor may land on a predetermined default transition symbol within the new state symbol, or on the transition symbol within the new state symbol closest to the transition just performed. For example, pressing 'up' in the slow play state 307 may cause the state cursor to land as indicated in FIG. 3.

The presence of a transition symbol may depend on the actual state of the appliance. For example, if the state cursor 302 is in the neutral state 305, and the appliance is neither playing nor recording, a permissible transition from the neutral state 305 to the open tray state 303 might be established, allowing the user to directly open the tray instead of directing the state cursor 302 from the neutral 305 via the stop play state 304 to the open tray state 303. Furthermore, the appliance may perform a state transition autonomously, for example, at the end of a disk a transition from the play state 309 to the stop play state 304 may be performed. As another example, a transition from the stop play state 304 to the open tray state 303 may cause a transition from the record state 310 to the stop record state 306, unless recording is done to an internal hard disk, or a removable second disk.

Figure 4:
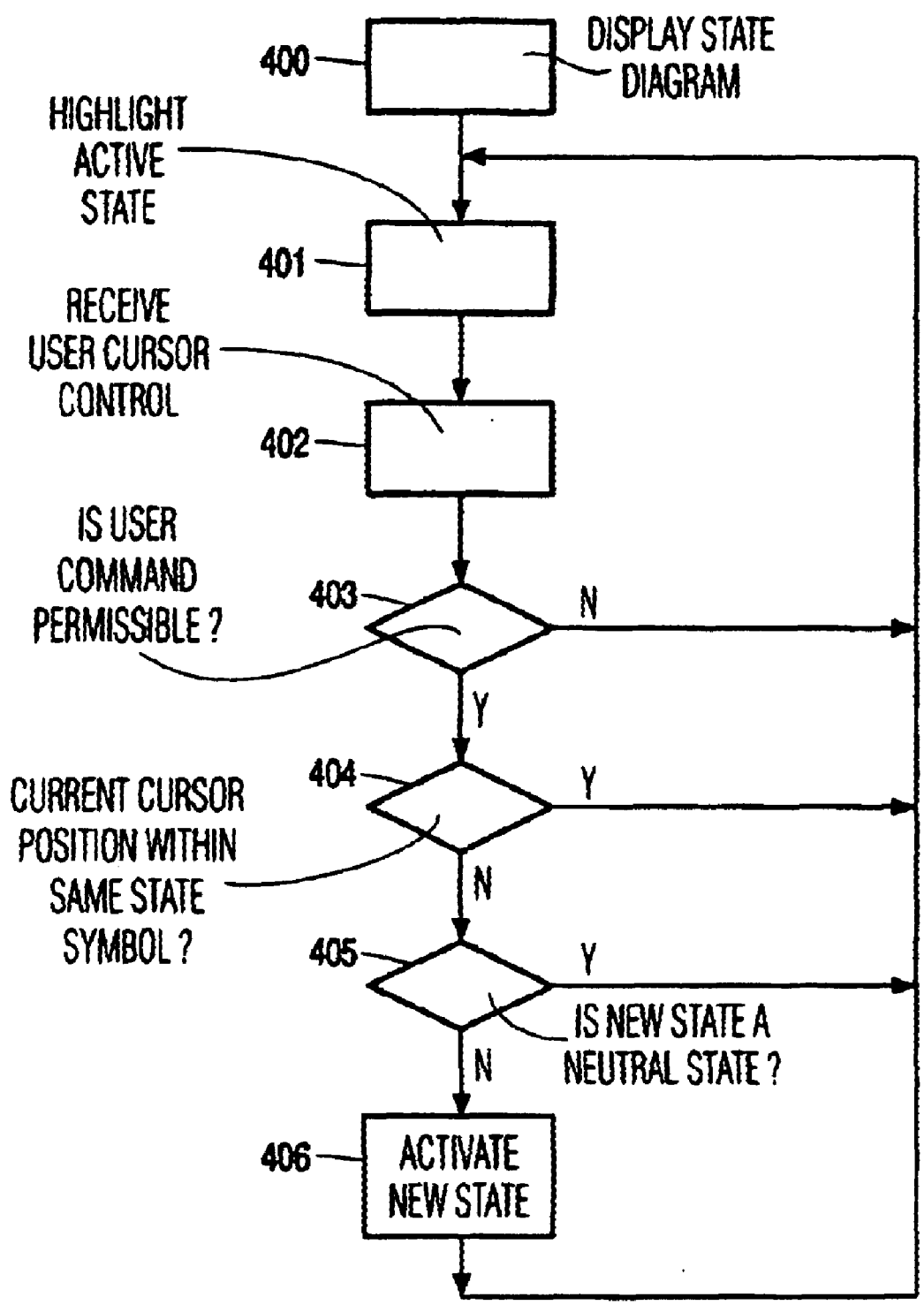
FIG. 4 shows a flow diagram of an embodiment of the method according to the invention.

FIG. 4 shows a flow diagram of an embodiment of the method according to the invention. In a step 400 a state diagram of the controlled appliance is displayed on a display screen. Steps 401 to 406 are comprised in a loop which is performed iteratively. In a step 401, the current state of the appliance is indicated by highlighting state symbols representing the active states, e.g. the stop play state 304 and the record state 310 of the previous example. Also a state cursor is displayed in accordance with its current position. The initial cursor position may coincide with the state symbol representing the default state of the appliance, e.g. the stop play state 304. In a step 402 a user supplied cursor control command is received, indicating one of four directions: left, right, up and down. In a step 403 it is determined whether the user command corresponds to a permissible state cursor relocation. If this is not the case, a next command is awaited in the step 402. Otherwise, it is determined in a step 404 if the new cursor position is within the same state symbol. If so, the cursor is moved to this new position in the step 401 and a next command is awaited in the step 402. If the new position is not in the same state symbol, it is determined in a step 405 if the new state symbol is a neutral state symbol. If so, the cursor is moved to the new position in the step 401 and a next command is awaited in the step 402. If the new state symbol represents a new state of the appliance, this new state is activated in a step 406, the new state and cursor position are indicated in the step 401 and subsequently a next command is awaited in the step 402.

In summary, the invention relates to a method of operating an appliance. The method according to the invention comprises the display of a state diagram on a display screen. The state diagram comprises state symbols representing operative states of the appliance. A state cursor is provided, which indicates a position relative to the state diagram, which state cursor can be relocated in response to user supplied cursor control commands. The appliance can be operated by navigating the state cursor to a state symbol representing a desired state of the appliance, which causes the appliance to adopt the desired state in response to said navigation.

Although the invention has been described with reference to particular illustrative embodiments, variants and modifications are possible within the scope of the inventive concept. Thus, for example, the state diagram may be displayed on a dedicated display screen of the controlled appliance or on the remote control of the appliance. The invention may also be used for controlling functions involving the setting of audio volume, picture contrast etc. Such a parameter setting state may be represented by a state symbol, in which case a slider window could pop up in response to the state cursor entering said state symbol, thus enabling the user to control the related parameter, e.g. the audio volume. Instead of a slider window, any other means for controlling such parameters may be applied.

The word 'comprising' does not exclude the presence of elements or steps other than those defined in a claim. The invention can be implemented by means of hardware comprising several distinct elements, and by means of a suitably programmed computer. In the device claim enumerating several means, several of these means can be embodied by one and the same item of hardware.

A 'computer program' is to be understood to mean any software product stored on a computer-readable medium, such as a floppy-disk, downloadable via a network, such as the Internet, or marketable in any other manner.

What is claimed is:

1. A method of operating an appliance, comprising a step of displaying a state diagram on a display screen, the state diagram comprising state symbols representing operative states of the appliance, a step of displaying a state cursor indicating a position relative to the state diagram, a step of displaying transition indications for indicating permissible transitions between said operative states, a step of user operably moving, in response to at least one user supplied command indicating a motion direction, the state cursor to a state symbol representing a desired state of the appliance, and a step of bringing the appliance into the desired state in response to said movement.

2. A method as claimed in claim 1, wherein the movement of the state cursor is restricted to proceed in accordance with said permissible transitions.

3. A method as claimed in claim 1, further comprising a step of displaying a neutral state symbol not representing an operative state of the appliance, a movement of the state cursor to said neutral state symbol having a neutral effect on the operation of the appliance.

4. A method as claimed in claim 2 or 3, further comprising a step of moving the state cursor relative to a state symbol without affecting the current state of the appliance, so as to select a respective state transition related to said state symbol.

5. A method as claimed in claim 1, further comprising a step of displaying at least one current state indicator marking a respective state symbol as representing a current state of the appliance.

6. A method as claimed in claim 1, further comprising a step of expanding a state symbol, in response to a movement of the state cursor to said state symbol, to display further state symbols representing subordinate states of a state represented by said state symbol.

7. A method as claimed in claim 6, further comprising a step of collapsing said state symbol to hide said further state symbols in response to a movement of the state cursor away from said state symbol.

8. An appliance comprising state diagram means for displaying a state diagram on a display screen, the state diagram comprising state symbols representing operative states of the appliance, the state diagram means being adapted to display transition indications for indicating permissible transitions between said operative states, user operable cursor movement means for moving, in response to at least one user supplied command indicating a motion direction, the state cursor to a state symbol representing a desired state of the appliance, the appliance being adapted to adopt the desired state in response to said movement.

9. An appliance as claimed in claim 8, wherein the movement means is adapted to restrict the movement of the state cursor in accordance with said permissible transitions.

10. An appliance as claimed as defined in claim 9, the movement means being further adapted to move the state cursor relative to a state symbol without affecting the current state of the appliance, so as to select a respective transition indication related to said state symbol.

11. An appliance as claimed in claim 8, the state diagram means being adapted to display a neutral state symbol not representing an operative state of the appliance, a movement of the state cursor to said neutral state symbol having a neutral effect on the operation of the appliance.

12. An appliance as claimed in claim 8, further comprising state indicator means for displaying at least one current state indicator marking a respective state symbol as representing a current state of the appliance.

13. An appliance as claimed in claim 8, the state diagram means being adapted to expand a state symbol, in response to a movement of the state cursor to said state symbol, to display further state symbols representing subordinate states of a state represented by said state symbol.

14. An appliance as claimed in claim 13, the state diagram means being further adapted to collapse said state symbol to hide said further state symbols in response to a movement of the state cursor away from said state symbol.

15. A audio or video player/recorder as an appliance as claimed in claim 8.

16. A television receiver as an appliance as claimed in claim 8.

17. A method of operating an appliance, comprising a step of displaying a state diagram on a display screen, the state diagram comprising state symbols representing operative states of the appliance, a step of displaying a state cursor indicating a position relative to the state diagram, a step of displaying a neutral state symbol not representing an operative state of the appliance, a movement of the state cursor to said neutral state symbol having a neutral effect on the operation of the appliance, a step of user operably moving, in response to at least one user supplied command indicating a motion direction, the state cursor to a state symbol representing a desired state of the appliance, and a step of bringing the appliance into the desired state in response to said movement.

18. A method as claimed in claim 17, the method further comprising a step of displaying transition indications for indicating permissible transitions between said operative states.

19. A method as claimed in claim 18, wherein the movement of the state cursor is restricted to proceed in accordance with said permissible transitions.

20. An appliance comprising state diagram means for displaying a state diagram on a display screen, the state diagram comprising state symbols representing operative states of the appliance, the state diagram means being adapted to display a neutral state symbol not representing an operative state of the appliance, a movement of the state cursor to said neutral state symbol having a neutral effect on the operation of the appliance, user operable cursor movement means for moving, in response to at least one user supplied command indicating a motion direction, the state cursor to a state symbol representing a desired state of the appliance, the appliance being adapted to adopt the desired state in response to said movement.

21. An appliance as claimed in claim 20, the state diagram means being adapted to display transition indications for indicating permissible transitions between said operative states.

22. An appliance as claimed in claim 21, wherein the movement means is adapted to restrict the movement of the state cursor in accordance with said permissible transitions.

* * * * *